US008818976B2

(12) United States Patent
McDermott et al.

(10) Patent No.: US 8,818,976 B2
(45) Date of Patent: *Aug. 26, 2014

(54) METHOD FOR ENHANCED VEHICLE SERVICE

(76) Inventors: Matt McDermott, Cave Creek, AZ (US); Larry Appleby, Cave Creek, AZ (US); Todd Oleno, Cave Creek, AZ (US); Mike Ellis, Cave Creek, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,397

(22) Filed: Jan. 27, 2012

(65) Prior Publication Data

US 2012/0131004 A1    May 24, 2012

Related U.S. Application Data

(63) Continuation of application No. 12/189,752, filed on Aug. 11, 2008, now Pat. No. 8,126,862.

(51) Int. Cl.
*G06F 17/30* (2006.01)

(52) U.S. Cl.
USPC ............ 707/705; 707/758; 707/770; 707/781

(58) Field of Classification Search
USPC .................................. 707/705, 758, 770, 781
See application file for complete search history.

(56) References Cited

U.S. PATENT DOCUMENTS

| | | | | |
|---|---|---|---|---|
| 5,469,576 A * | 11/1995 | Dauerer et al. | ..................... | 726/2 |
| 6,012,085 A * | 1/2000 | Yohe et al. | ..................... | 709/217 |
| 6,014,668 A * | 1/2000 | Tabata et al. | ............................ | 1/1 |
| 6,047,312 A * | 4/2000 | Brooks et al. | .................. | 709/203 |
| 6,339,787 B1 * | 1/2002 | Yohe et al. | ..................... | 709/217 |
| 6,735,623 B1 * | 5/2004 | Prust | .............................. | 709/219 |
| 7,058,696 B1 * | 6/2006 | Phillips et al. | ................. | 709/217 |
| 7,136,903 B1 * | 11/2006 | Phillips et al. | ................ | 709/217 |
| 7,596,512 B1 * | 9/2009 | Raines et al. | .............. | 705/26.61 |
| 7,761,591 B2 * | 7/2010 | Graham | ........................ | 709/233 |
| 7,778,841 B1 * | 8/2010 | Bayer et al. | ................... | 705/306 |
| 7,788,335 B2 * | 8/2010 | Miloushev et al. | ........... | 709/213 |
| 8,108,579 B2 * | 1/2012 | Purlia | .............................. | 710/74 |
| 8,595,079 B1 * | 11/2013 | Raines et al. | ................. | 705/26.1 |
| 8,600,823 B1 * | 12/2013 | Raines et al. | ................. | 705/26.1 |
| 2002/0143533 A1 * | 10/2002 | Lucas et al. | .................... | 704/235 |
| 2003/0023616 A1 * | 1/2003 | Kay et al. | ....................... | 707/200 |
| 2003/0028538 A1 * | 2/2003 | Eikenbery | ........................ | 707/10 |
| 2003/0050996 A1 * | 3/2003 | Yohe et al. | ..................... | 709/217 |
| 2003/0195940 A1 * | 10/2003 | Basu et al. | ..................... | 709/213 |
| 2003/0204529 A1 * | 10/2003 | Hertling et al. | ............... | 707/200 |
| 2004/0088313 A1 * | 5/2004 | Torres | ........................... | 707/101 |
| 2004/0210644 A1 * | 10/2004 | Prust | .............................. | 709/219 |
| 2005/0192966 A1 * | 9/2005 | Hilbert et al. | ................... | 707/10 |
| 2005/0273486 A1 * | 12/2005 | Keith | ............................ | 709/200 |
| 2005/0278422 A1 * | 12/2005 | Prust | .............................. | 709/203 |
| 2006/0129627 A1 * | 6/2006 | Phillips et al. | ................ | 709/200 |
| 2006/0149889 A1 * | 7/2006 | Sikha | ............................ | 711/100 |
| 2006/0161387 A1 * | 7/2006 | Jowett et al. | ................... | 702/182 |

(Continued)

*Primary Examiner* — Hanh Thai
(74) *Attorney, Agent, or Firm* — Snell & Wilmer LLP

(57) ABSTRACT

A method according to the present invention may be used to convey information to enhance customer service for a wide variety of industries, and especially the automotive repair industry. Among other things, methods of the present invention allow a service provider to supply customers with information on services provided using one or more methods of distribution and in a manner that is fast, efficient, and easy for the customer to access. The information provided to customers can be distributed in a variety of formats and stored permanently for retrieval by the customer at any time.

31 Claims, 11 Drawing Sheets

(56) References Cited

U.S. PATENT DOCUMENTS

| | | | |
|---|---|---|---|
| 2006/0243788 A1* | 11/2006 | Waco | 235/375 |
| 2007/0016613 A1* | 1/2007 | Foresti et al. | 707/104.1 |
| 2007/0203874 A1* | 8/2007 | Cave et al. | 707/1 |
| 2007/0282927 A1* | 12/2007 | Polouetkov | 707/204 |
| 2008/0119983 A1* | 5/2008 | Inbarajan et al. | 701/36 |
| 2008/0300962 A1* | 12/2008 | Cawston et al. | 705/10 |
| 2008/0306651 A1* | 12/2008 | Davis et al. | 701/35 |
| 2009/0055742 A1* | 2/2009 | Nordhagen | 715/716 |
| 2009/0234809 A1* | 9/2009 | Bluger et al. | 707/3 |
| 2009/0300025 A1* | 12/2009 | Rothschild | 707/10 |
| 2009/0307027 A1* | 12/2009 | Charbeneau et al. | 705/7 |

* cited by examiner

FROM: HOMETOWN MOTORS
TO: CUSTOMER@CustomerEmail.com
SUBJECT: YOUR TECHNICIAN COMMENTS FROM HOMETOWN MOTORS

HOMETOWN MOTORS

THANK YOU FOR TRUSTING HOMETOWN MOTORS WITH YOUR VEHICLE NEEDS. WE APPRECIATE YOUR BUSINESS. THE FOLLOWING LINK BELOW WILL ALLOW YOU TO LISTEN TO COMMENTS FROM THE TECHNICIANS WHO SERVICES YOUR VEHICLE.

CLICK HERE TO PLAY YOUR TECHNICIAN COMMENTS FROM HOMETOWN MOTORS.

Bob Smith
Master Trim Technician
18 Years Experience
Hometown Motors

Bill Doe
Lube Technician
2 Years Experience
Hometown Motors

Joe Kool
Master Transmission Technician
14 Years Experience
Hometown Motors

Dan Dickie
Service Advisor
6 Years Experience
Hometown Motors

Ima Trainer
Service Manager
10 Years Experience
Hometown Motors

HOMETOWN MOTORS SALES
123 STREET
SOMEWHERE, USA 88888
SALES HOURS: 8 AM TO 9 PM: MON-SUNDAY
SALES@HOMETOWNMOTORS.COM
(800) 555-5555

CONTACT NUMBERS FOR HOMETOWN MOTORS
SALES DEPARTMENT: (800) 555.1234
SERVICE DEPARTMENT: (800) 555.1235
PARTS DEPARTMENT: (800) 555.1236
ACCESSORIES DEPARTMENT: (800) 555.1237

HOMETOWN MOTORS SERVICE
123 STREET
SOMEWHERE, USA 88888
SERVICE HOURS: 7 AM TO 7 PM MON-FRI
SERVICE@HOMETOWNMOTORS.COM
(800) 555.5555

COUPONS

FREE GAS
WITH TEST DRIVE

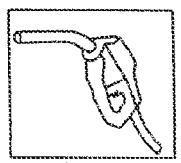

SEE YOUR SALES ASSOCIATE FOR DETAILS

FREE OIL CHANGE

WITH 30K MILE SERVICE SPECIAL
SEE YOUR SERVICE ADVISOR FOR DETAILS

FIGURE 8

METHOD FOR ENHANCED VEHICLE SERVICE

CROSS-REFERENCE TO RELATED APPLICATIONS

This application is a continuation of and claims priority to U.S. patent application Ser. No. 12/189,752 entitled SYSTEM FOR ENHANCED CUSTOMER SERVICE, filed on Aug. 11, 2008.

NOTICE OF INCLUDED COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. All trademarks and service marks identified herein are owned by the applicant.

DESCRIPTION OF THE INVENTION

1. Field of the Invention

The present invention relates to systems and methods for data management, and more particularly, to systems and methods for providing customer service, building customer loyalty, and facilitating targeted marketing efforts.

2. Background of the Invention

For many businesses, particularly those in service-based industries, a lack of communication between the customer and the business can be the greatest obstacle to a positive experience for the customer. Customers who feel uninformed about the service a business provides may walk away feeling frustrated, confused, that they were overcharged, or that they did not receive everything promised to them.

An increasing number of websites and blogs on the Internet dedicated to consumer affairs and product reviews are providing individuals with the ability to relate their experiences to a wide audience. Through these sites, a negative review by a single unhappy customer can influence many potential customers to avoid a product or service provided by a business. Accordingly, the importance of providing exemplary customer service to help ensure happy, loyal customers has never been greater.

In the automotive industry, for example, mechanics frequently perform services such as repairs and diagnostic procedures on vehicles without ever speaking directly to the owner of the vehicle. Even when a customer is able to speak directly to a mechanic who performs the service on his/her vehicle, the customer may still not fully understand the full extent of the service due to its complexity (and the complexity of the terminology used to describe it), or be able to remember everything they were told hours or days later (e.g., when a family member asks about the service). Similar issues exist in other industries (such as law, medicine, and insurance), where a customer's understanding of (and satisfaction with) a service is largely dependent upon the service provider's ability to communicate complex information to the customer. The present invention addresses these and other issues.

SUMMARY OF THE INVENTION

Methods and systems according to the present invention may be used to convey information to enhance customer service for a wide variety of industries. Among other things, systems and methods of the present invention allow a service provider to provide customers with information on services provided for the customer in a manner that is fast, efficient, and easy for the customer to access. The present invention also allows service providers to gather metrics on communications to customers, as well as to facilitate targeted marketing efforts to help build customer loyalty.

A method performed by a computer system according to one aspect of the present invention comprises establishing a connection between the computer system and a data source, and receiving data from the data source over the connection. A file containing the data received from the data source is created by the computer system, and an entry is created in a database, where the entry comprises reference information pertaining to the file.

A computer system according to another aspect of the present invention comprises a communications interface, a processor coupled to the communications interface, and a memory coupled to the processor. The memory stores instructions that, when executed by the processor, cause the processor to establish a connection with a data source using the communications interface and receive data from the data source through the communications interface. The memory further stores instructions to cause the processor to create a file that comprises data received from the data source, as well as to create an entry in a database, the entry comprising reference information pertaining to the file.

A method performed by a computer system according to another aspect of the present invention comprises storing a file on the computer system, where the file includes: an identifier for a vehicle; an identifier for a customer; and information regarding a service performed on the vehicle. The method further includes creating an entry in a database, the entry comprising reference information pertaining to the file.

According to another aspect of the invention, a method for storing a file, and performed by a computer having a searchable database, comprises storing a file into the searchable database. The file includes at least one of audio, video, text, and still images. In this method, the file reference is capable of being located in the database by searching one or more fields, where the one or more fields are selected from the group consisting of: a VIN of an automobile; a name of the person who created the file; a make, model and year of manufacture of the automobile; a name of an entity that created the file; a date the file was created; a date the file was stored in the searchable database; and a type of problem addressed in the file.

A computer system according to another aspect of the present invention comprises a communications interface, a processor coupled to the communications interface, and a memory coupled to the processor. The memory stores instructions that, when executed by the processor, cause the processor to store a file on the computer system. The file comprises an identifier for a vehicle; an identifier for a customer; and information regarding a service performed on the vehicle.

A computer system according to another aspect of the present invention comprises a searchable database, a processor coupled to the communications interface, and a memory coupled to the processor. The memory stores instructions that, when executed by the processor, cause the processor to perform a method for storing a file that has been received. The file includes at least one of audio, video, text, and still images. The method comprises storing a file reference into the searchable database, the file capable of being located in the database by searching one or more fields. The one or more fields are selected from the group consisting of: a VIN of an automobile; a name of the person who created the file; a make, model and year of manufacture of the automobile; a name of an entity that created the file; a date the file was created; a date the file reference was stored in the searchable database; and a type of problem addressed in the file.

Both the foregoing summary and the following detailed description are exemplary and explanatory only and are not restrictive of the invention.

BRIEF DESCRIPTION OF THE DRAWINGS

A more complete understanding of the present invention may be derived by referring to the detailed description and claims when considered in connection with the following illustrative figures.

FIG. 8 depicts a sample email with exemplary content in the fields depicted in FIG. 7.

DETAILED DESCRIPTION OF EXEMPLARY EMBODIMENTS

Figure 1:
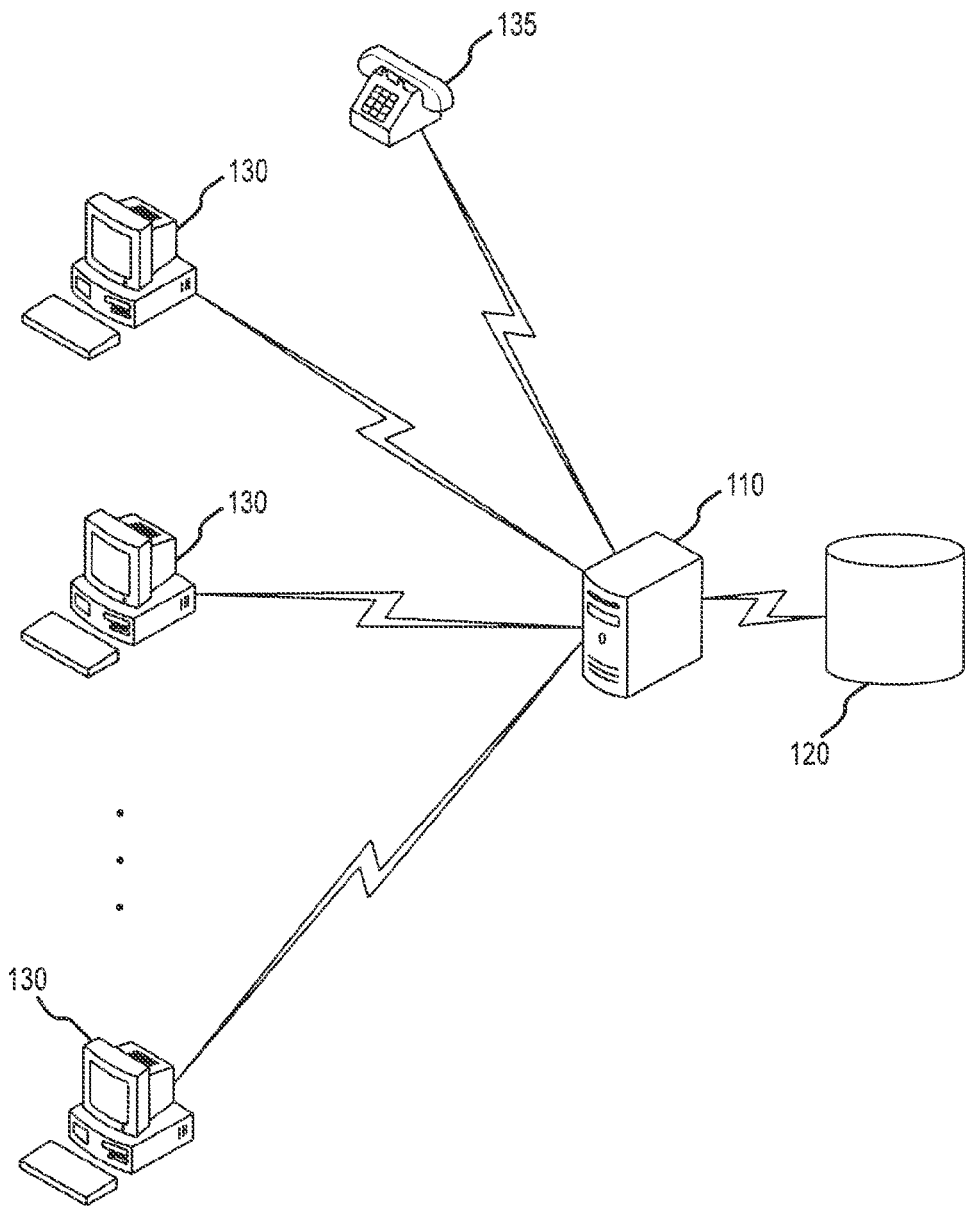
FIG. 1 is a block diagram depicting an exemplary system according to various aspects of the present invention.

An exemplary system according to various aspects of the present invention is depicted in FIG. 1. This system may be used in conjunction with the method described in FIG. 2, as well as with any subset or combination of the elements thereof. The system shown in FIG. 1 may also be used in conjunction with any other suitable embodiments of systems and methods, including those of the present invention.

The system in FIG. 1 includes a server 110 in communication with a database 120 and one or more computer systems 130. The server includes a processor (not shown) and a memory (not shown). The processor retrieves and executes instructions stored in the memory to control the operation of the server, including communication with the database 120 and one or more computer systems 130. The server 110 may include or operate in conjunction with any type (and number) of computers, computer systems, computer networks, computer workstations, minicomputers, mainframe computers, or computer processors (such as an integrated circuit microprocessor or microcontroller). The server 110 may include an operating system (e.g., Windows NT, 95/98/2000/XP/Vista, OS2, UNIX, Linux, Solaris, MacOS) as well as various conventional support software and drivers typically associated with computers. In certain embodiments, dedicated data management applications may be entirely or partially served or executed by the server 110 in performing methods or processes of the present invention. The server 110 may also be configured as a web server to host any number of Internet websites, as well as an e-mail server with multiple domains.

A memory operating in conjunction with the server 110 may include any combination of different memory storage devices, such as hard drives, storage area networks (SANs) (e.g., disk arrays, tape libraries, optical jukeboxes), networked attached storage (NAS), NAS-SAN hybrid systems, random access memory (RAM), read only memory (ROM), FLASH memory, or any other type of volatile and/or nonvolatile memory. Systems and methods of the present invention may also store and retrieve data from one or more databases 120.

The server 110 communicates with one or more computer systems 130. A computer system 130 operating in conjunction with the present invention may include any desired computing device, such as a laptop computer, a desktop computer, a mobile subscriber communication device, a mobile phone, a personal digital assistant (PDA), and/or a data tablet. A computer system 130 used to provide data to the server 110 may include any suitable user interface components to allow a user to provide data to the server 110, such as a keyboard, mouse, touch pad, touch screen, alphanumeric keypad, voice recognition system, and/or other input device. Similarly, a computer system 130 may include any number of suitable output devices, such as a monitor, speaker, printer, or other device. A computer system 130 may also include software to allow a user to connect to the server 110, select various user interface components (such as a microphone or camera) to provide data to the server 110, access a file or database entry stored on the server 110 or database 120, or perform any other suitable function in accordance with the present invention.

Figure 3:
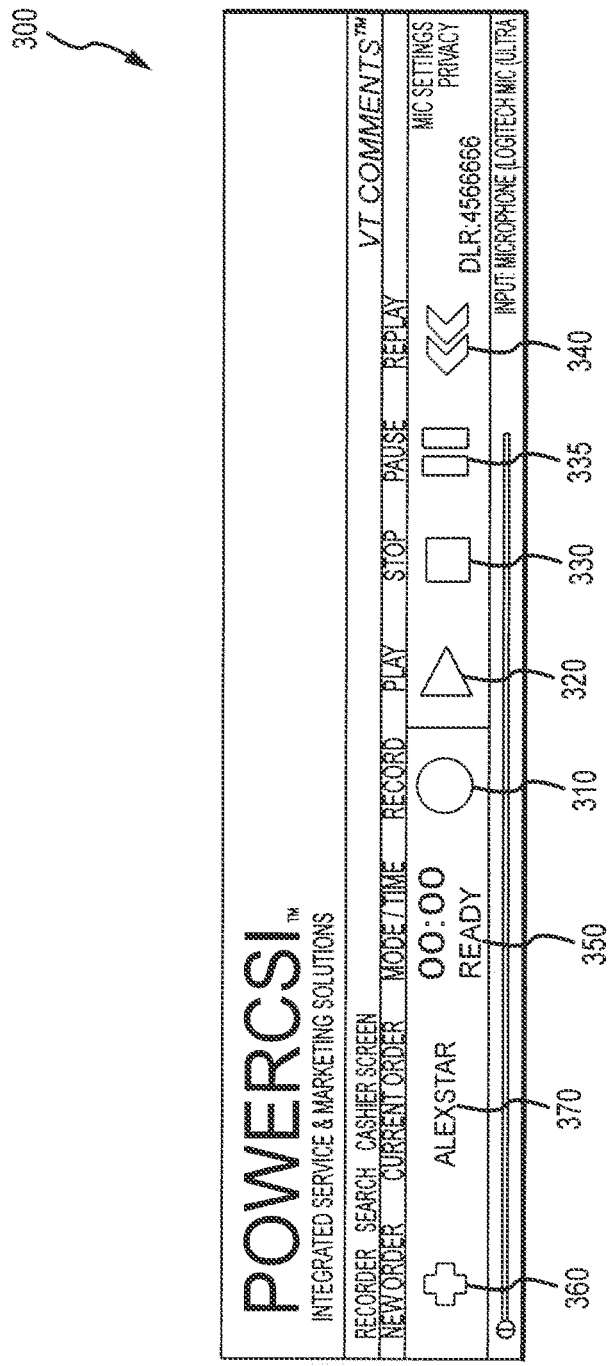
FIG. 3 depicts an exemplary software user interface according to various aspects of the present invention.

In one exemplary embodiment of the present invention, referring now to FIG. 3, software on a computer system 130 acting as a data source to the server 110 comprises a user interface 300 to allow the recording of audio data and/or video data by a user. In this embodiment, user interface 300 includes a record button 310, play button 320, stop button 330, a pause button 335, replay button 340, mode and time indicator 350, new order number button 360, and status bar 370. The user interface 300 may include any other desired controls, such as a fast forward button, and/or rewind button. The buttons and controls of the user interface 300 may be manipulated in any desired manner, such as by using a mouse or other control device.

The user may log in to satisfy security requirements and to establish a connection between the server 110 and the computer system 130, as is discussed in more detail with reference to FIG. 4 below. When the connection (e.g., a RTMP) connection is established, the server 110 can receive data through the computer system 130. The user selects an order number corresponding to the repair using the new service invoice button 360. When the user presses the record button 310, audio and/or video recorded by the computer system 130 (e.g., through a microphone and/or camera) is streamed to the server 110 and used to create the file. The order number may be used to label or identify the file created with recorded data. In this manner, a user, such as a mechanic who performed a service on a vehicle or doctor who diagnosed or provided services to a patient, can speak into a microphone and describe the service performed. Video of the service, vehicle, replaced parts, or other subject matter can be described by the user and streamed (i.e., transmitted as it is recorded) to the server 110.

The user can press the stop button 330 or pause button 335 to stop or pause the recording, and can use the play button 320 to play (and thereby review) the file containing the audio and/or video recorded to the file. The user can use the replay button 340 to replay the file from the beginning The mode and time indicator 350 shows the elapsed time of the recording, as well as any appropriate mode indicator (e.g., ready to record). The status bar 370 conveys information such as the current service invoice number, an identifier for the service provider (e.g., dealership or repair center) where the repair is performed, an identifier for the user, the type of input device(s) (e.g., a microphone and/or camera) used to record the data, as well as any other desired information. To save storage space on the server 110, database 120, and/or other storage medium (such as a storage area network in communication with the server 110), files and database records can be archived. Archiving can be performed based on any desired criteria, such as the current storage capacity of the server 110, as well as the age of a file or database record. The database record can be updated to point to the new archived location of a file, allowing users to continue to access the file.

A user may add, delete, modify, or record over data previously recorded to a file, provided the user satisfies any appropriate security requirements. A user's ability to record over data, or otherwise modify a file, may be dependent on any number of desired criteria, such as a privilege level of the user and/or whether the communication providing the file has already been sent to the customer. The user may record over any desired subject matter recorded to the file by, for example, selecting a desired point in a previously recorded portion of audio and/or video and re-recording from that point. Alternatively, a user may selectively edit, rearrange, or modify recorded audio and/or video using any desired method, such as commercially-available editing software. A user may modify a file using data from any suitable source, such as a scanned document as is described in more detail below with regards to FIG. 10.

The server 110 may communicate with a computer system 130 (or any other device) in any desired manner. In one embodiment, the server 110 and computer system 130 may communicate with each other through a wireless system such as a wireless mobile telephony network, General Packet Radio Service (GPRS) network, wireless Local Area Network (WLAN), Global System for Mobile Communications (GSM) network, Personal Communication Service (PCS) network, Advanced Mobile Phone System (AMPS) network, and/or a satellite communication network. The server 110 may communicate through any other type of connection, such as a wired Internet connection, a wireless Internet connection, a cellular telephone network connection, a wireless LAN connection, a wireless WAN connection, an optical connection, a USB connection, a mobile device synchronization port connection, a power connection, and/or a security cable.

The server 110 may communicate with one or more databases 120. A database 120 operating in conjunction with the present invention may be implemented as a database management system (DBMS), a relational database management system (e.g., DB2, Oracle, SQL Server, My SQL, ACCESS, etc.), an object-oriented database management system (ODBMS), a file system, or in any another manner. The database 120 can be accessed by the server 110 via a Structure Query Language (SQL) or in any other desired manner. The database 120 may be organized in any suitable manner, including as data tables or lookup tables. Association of certain data may be accomplished through any desired data association technique and data association may be accomplished manually and/or automatically. In one embodiment, the database 120 is configured to store information related to a service performed for a customer. Information from the database 120 may be used by the service provider to provide customer service, build customer loyalty, and facilitate targeted marketing efforts, as is described in more detail below.

Figure 2:
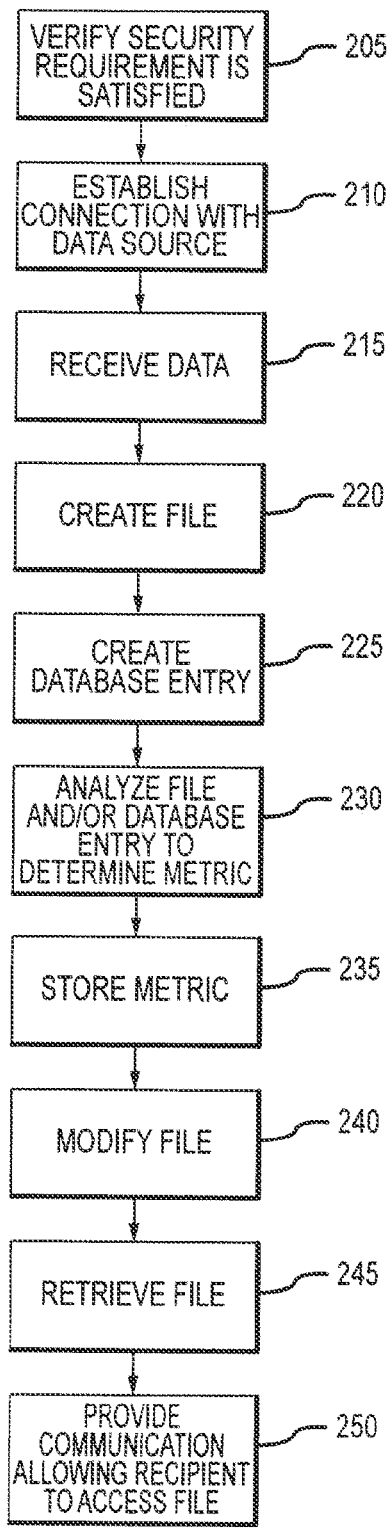
FIG. 2 is a flow diagram depicting an exemplary process according to various aspects of the present invention.

An exemplary method according to the present invention is depicted in FIG. 2. In this method, a connection with a data source is established (210) provided any security requirements are satisfied (205). Data is received from the data source (215) and used to create a file (220). A database entry that includes reference information pertaining to the file is created (225). The file and/or database entry may be analyzed to determine a metric (230). The metric may be stored (235) for later retrieval. The file may be modified (240) and retrieved (245). A communication is provided to a recipient (such as a human or computer system), allowing the recipient to access the file (250).

Any combination and/or subset of the elements of the method depicted in FIG. 2 may be practiced in any suitable order and in conjunction with any system, such as the system depicted in FIG. 1, as well as with any other device, and/or process. The method shown in FIG. 2 can be implemented in any suitable manner, such as through software operating on one or more computer systems. Any suitable portion of the method in FIG. 2 may also be practiced manually by a human being.

In the exemplary process according to aspects of the present invention depicted in FIG. 1, a connection with a data source is established (210) provided any predefined security requirements are satisfied (205). Systems and methods of the present invention may utilize one or more security requirements to protect data, restrict access, or provide any other desired security feature. For example, a computer system (such as the server 110) may encrypt data transmitted to it from data sources (such as computer systems 130), and/or may encrypt some or all data stored within the server itself or in database 120. Different users and data sources may also have different security requirements and/or different levels of access to data stored by the server 110 or database 120. Such security measures may be implemented using hardware, software, or a combination thereof. Any method of data encryption or protection may be utilized in conjunction with the present invention, such as public/private keyed encryption systems, data scrambling methods, hardware and software firewalls, tamper-resistant or tamper-responsive memory storage devices or any other method or technique for protecting data. Similarly, passwords, biometrics, access cards or other hardware, or any other system, device, and/or method may be employed to restrict access to any device operating in conjunction with the present invention.

Figure 4:
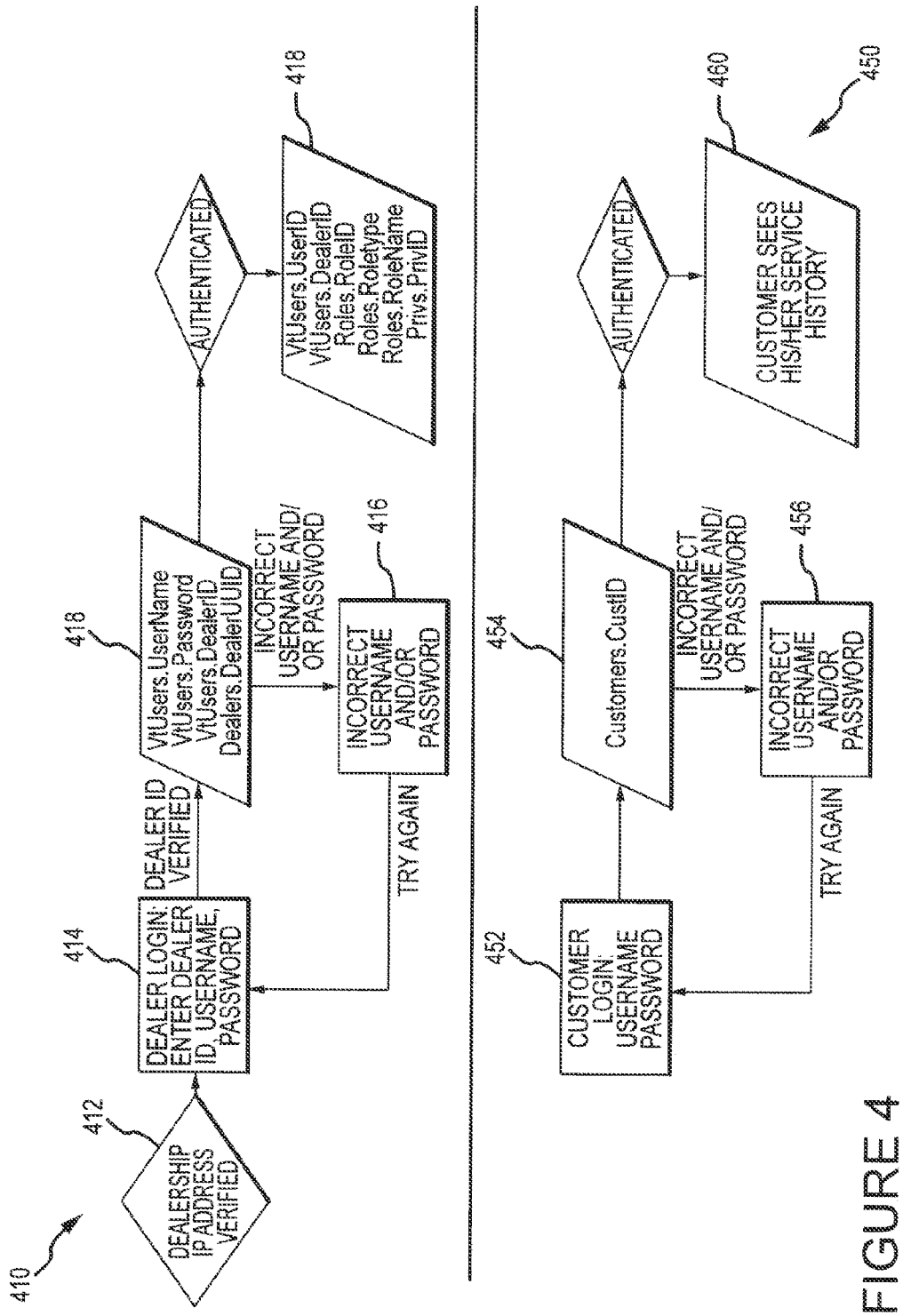
FIG. 4 depicts flow diagrams of exemplary login procedures according to various aspects of the present invention.

FIG. 4 includes flow diagrams for exemplary login procedures for members of a service provider (410) and a customer (450) whom; for example, a car repair service was performed. For the login of a service provider member (410), the server 110 verifies that the Internet Protocol (IP) address used by the service provider member's computer system 130 corresponds to an expected address (412), to prevent unauthorized use. Additionally, the member of the service provider enters a valid username, password, and service provider identifier (414) to successfully login. If the username, password, or identifier is incorrect (416), the service provider member may retry entry, or may be locked out entirely if too many incorrect attempts are made. Upon successful login, one or more of the service provider member's username, password, service provider ID, role of the user (e.g., administrator, cashier, manager, director, advisor, or technician), and privileges of the user, are noted by the software operating on the server 110

(418). Users having different roles and/or privileges may thus be restricted from performing different functions on the server 110.

For the login of a customer (450), a customer enters a username and password (452). The username and password (as well as a link to a website hosted on the server 110 having the login screen) may be provided to the customer in a communication, as is discussed in more detail below. If the username and/or password is incorrect (456), the customer may retry entry, or may be locked out entirely if too many incorrect attempts are made. Upon successful entry of the username and password (454), the customer's identification is noted and the customer is given access to his/her service history (460), as well as access to the file(s) in the customer's service history.

The customer's service history (and associated files) may include all services performed on any vehicle currently owned by the customer, as well as all services performed for the customer on any vehicle, whether or not the customer currently owns the vehicle. In one embodiment of the present invention, for example, the service history of a vehicle is removed from a customer's overall service history when the customer no longer owns the vehicle. The service history for the vehicle may then be transferred to the service history for the purchaser of the vehicle. Alternatively, users of systems and methods of the present invention may access the service history of a vehicle independent of the current owner of the vehicle. Among other things, allowing alternate identifiers (such as a VIN of a vehicle) to access service histories and files helps ensure that records can be retrieved even when ownership of a vehicle has been transferred or is unknown.

A computer system (such as server 110) may communicate with one or more data sources (such as computer systems 130) using any desired connection. In one embodiment of the present invention, the server 110 includes a wireless transceiver to communicate with other systems and devices through a wireless system such as a wireless mobile telephony network, General Packet Radio Service (GPRS) network, wireless Local Area Network (WLAN), Global System for Mobile Communications (GSM) network, Personal Communication Service (PCS) network, Advanced Mobile Phone System (AMPS) network, and/or a satellite communication network. A server 110 operating in conjunction with the present invention may also communicate with other systems and devices through any other type of connection, such as a wired Internet connection, a wireless Internet connection, a cellular telephone network connection, a wireless LAN connection, a wireless WAN connection, a mobile device synchronization port connection, a power connection, a serial peripheral interface bus (SPI) connection; a universal serial bus (USB) connection; a RS-232 serial connection, an Ethernet connection, an optical fiber connections, a Firewire connection and/or a security cable. Data from a data source may be received using any number and combination of such connections, as well as any other type of connection. Additionally, the server 110 may communicate with a data source any suitable data format and communications protocol.

In one exemplary embodiment of the present invention, data is streamed to and from the server 110 using a Real Time Messaging Protocol (RTMP) protocol from Adobe Systems, Inc., which provides a socket connection for two-way communication between data sources and the server 110. Using the RTMP protocol, the server 110 can create files in real-time from data streamed to the server 110 by data sources. Through the RTMP connection, the server 110 also allows users to view the created files, as is discussed in more detail below.

The server 110 may communicate with any desired data source, such as one or more computer systems 130 (e.g., a laptop computer, a desktop computer, a mobile subscriber communication device, a mobile phone, a personal digital assistant (PDA), and/or a data tablet). A server 110 operating in conjunction with the present invention also be configured to implement an Interactive Voice Response (IVR) system, and/or to recognize DTMF tones, in order to receive data from a human data source, such as an individual providing information through a telephone 135.

Data received from a data source may be in any format, such as audio, video, text, and one or more still images. For example, embodiments of the present invention may receive information in a data packet, an SMS text message, MMS message, a voice mail message, an email message, and/or a predetermined sequence of one or more DTMF tones. The data can be included in a file having a tokenized format such as standard ASCII text format, or any other suitable standardized file format, such as an MS Word document, MS Excel file, Adobe PDF file, or binary picture file (JPEG, bitmap, etc.). The data within such a file can be ordered in any manner and have any suitable delimiters, notations, or other features.

The server 110 creates a file using the data received from the data source (220). The file may be of any format, and may include data of differing formats, such as text, audio, video, and/or still images. In one embodiment of the present invention, the file is in Flash Video Format (FLV) from Adobe Systems, Inc. The file may be created in any desired manner. For example, the file may be created once all data to be added to the file has been received from one or more data sources. The file may also be created in real-time by adding data to the file as it is received from the data source. The file may be stored in a memory device (such as a hard drive) in communication with the server 110, or in a database 120. The file may be stored locally to the server 110 or stored remotely from the server 110, such as in a secure data storage facility.

Any type of information may be received from a data source and included in the file created by the server 110, such as data pertaining to a service provided for a customer. In one embodiment of the present invention, for example, data pertaining to a repair performed on a vehicle by a service provider (such as a car dealership) may include a vehicle identifier, a customer identifier, a user identifier (e.g., an identifier for a mechanic who performed the service or for a service manager), an identifier for the service provider (e.g., dealership or repair center) at which the repair was performed, a repair order identifier, and/or information regarding the repair performed on the vehicle.

In accordance with the present invention, the file can include audio, video, still images, and/or text showing the repair being performed or other information regarding the repair. In one exemplary embodiment, a computer having a searchable database stores such a file reference in the database. The file can be located in the database by searching one or more fields, such as the vehicle identification number (VIN) of an automobile, the name of the person and/or entity who created the file, the make, model and year of manufacture of the automobile, the date the file was created, the date the file was stored in the searchable database, and/or the type of problem addressed in the file (e.g., the repair procedure that was performed on the vehicle).

The file may additionally include audio, video, text or pictures of the faulty/broken parts removed from the vehicle, new parts that were installed in a vehicle, and/or maintenance or repairs suggested by the service provider. The file can also show the location where the parts reside in the vehicle to, for example, educate the customer and help explain the amount of labor involved in replacing a part that is difficult to access.

In one exemplary embodiment, the file is created real-time as data is received from the data source connected to the server 110, such as a user (e.g., the technician performing the repair) providing input to a microphone, camera, or other receiver connected to a computer system 130. The audio and/or video data from the data source is provided to the server 110, and is stored in the file in the database 120.

An entry in the database 120 is created (225) with reference information (also known as fields) pertaining to the file to facilitate the storage and retrieval of the file (245) using the reference information. The database entry may be separate from, linked to, or integrated with, the file. The database entry may be created using a database having any desired database implementation, such as a hierarchal database, relational database, and/or network database. The file may be searched for, accessed, and retrieved by the server 110, or by using any device capable of communication with the server 110, such as computer systems 130. Access to the file may be protected using any desired security requirement, such as those described above with regards to step (205). Among other things, the reference information for the database entry allows the file to be indexed and/or searched for according to a variety of fields, such as the creation date of the file, the identity of the user who created the file, the content of the file (e.g., a particular type of service), or any other suitable fields. Some or all of the fields may be automatically populated when the file is created and/or manually populated (e.g., by the user who created the file). The fields of the database entry may be added, removed, or modified after the file is created as well.

Figure 5:
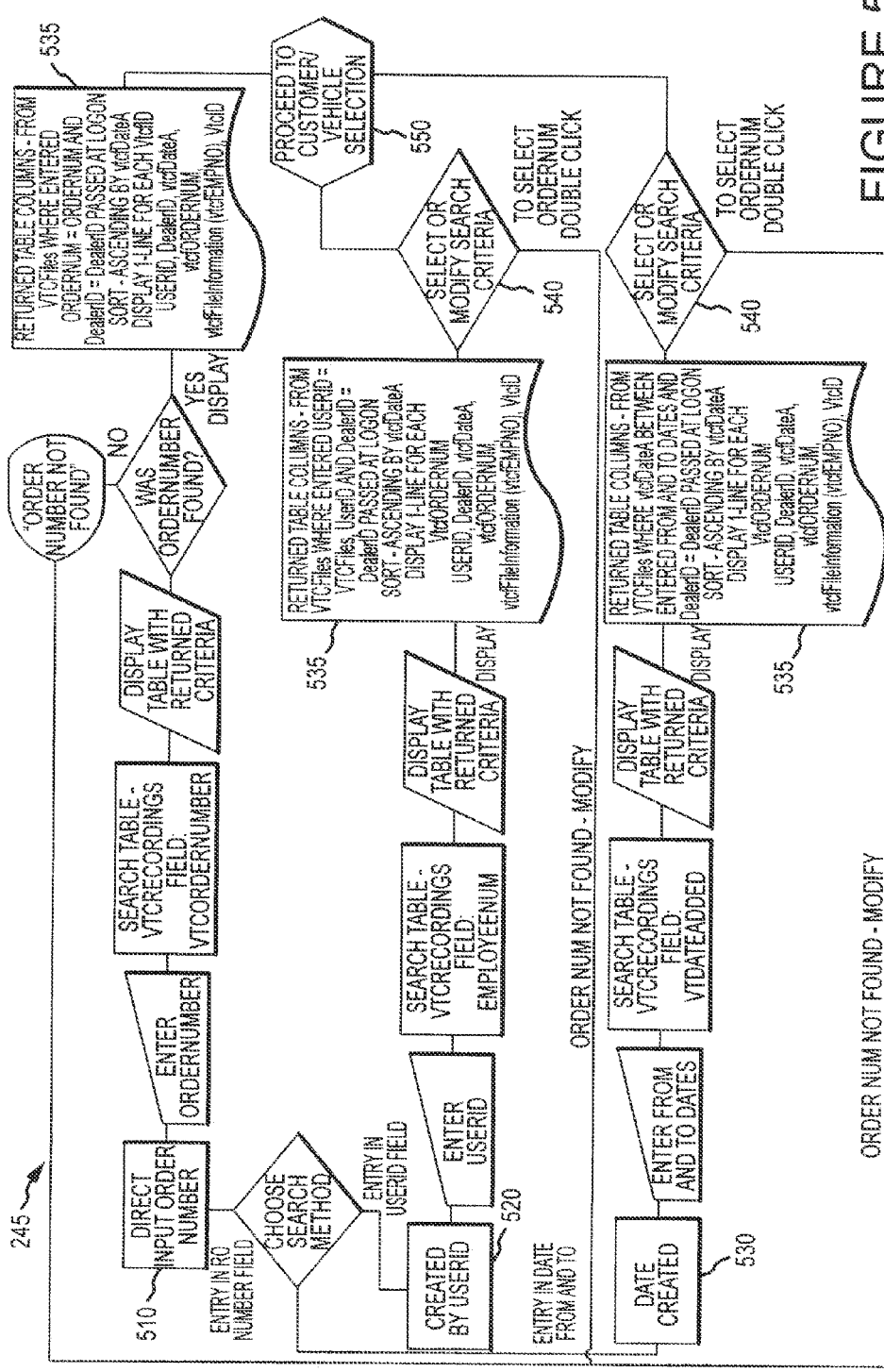
FIG. 5 is a flow diagram depicting an exemplary process for retrieving a file according to various aspects of the present invention.

FIG. 5 depicts an exemplary process for retrieving a file (245) in accordance with the present invention. In this exemplary embodiment, the file contains information pertaining to a vehicle repair. In one subprocess, a file can be searched for based on an order number (510). Similarly, the database can be searched for based on the identification of a user who created the file (520) or the date the file was created (530). In each subprocess, a table is displayed (535) with the entrie(s) that match the search criteria. The user may select a file from the table or modify the search criteria (540). In this exemplary process, a user may additionally select a customer and/or vehicle to send a communication to the customer, as described in more detail with regard to FIG. 6 below.

The file and/or database entry can be analyzed to determine one or more metrics (230). Such metrics may pertain to the creation of the file, retrieval of the file, the providing of the communication to the recipient, or any other aspect of the present invention. For example, in one embodiment of the present invention where the file includes information pertaining to a repair service for a vehicle, the metric may include a repair history for a vehicle, contact information for a customer, marketing information, a status of a repair procedure for a vehicle, and combinations thereof. The analysis and determining of metrics may be performed automatically by the server 110, or in response to a command from a user of the server 110. Metrics may be stored (235) (e.g., in a memory device or the database 120) for retrieval by a user of the server 110. Access to stored metrics can be restricted based on a predefined security requirement, such as those discussed previously for step (205). Among other things, the metrics can allow a user to review, gather statistics, and/or generate reports pertaining to the current and past operation of systems and methods of the present invention in order to verify that a desired level of information is being provided to customers.

The file may be modified (240) at any time and in any manner. Modification of the file may include the addition, as well as the deletion, of any desired content, such as audio, video, text, and still images. Content can be added to, or deleted from, any portion of the file. The file may be modified manually by a user, as well as automatically by the server 110. In one exemplary embodiment of the present invention, a file containing data pertaining to a vehicle repair, and created by a technician performing the repair, can be reviewed by a supervisor (e.g., from the service department or sales department of the service provider where the vehicle was serviced) provided a predefined security requirement (such as those discussed for step (205) above) has been met. The supervisor can remove or correct any erroneous or undesirable content in the file, as well as add new content (such as a customized or personalized greeting to the customer(s) the file will be sent to). The server 110 may also automatically modify any desired portion of the file.

A communication is provided to a recipient that allows the recipient to view the file (250). The communication may be provided to a recipient in any desired manner. For example, embodiments of the present invention may provide the file (or access to the file) in an SMS text message, MMS multimedia message, a voice mail message, an email message, and/or using any other desired form of communication.

The communication may include any desired information. For example, the communication may include content that is selected based on identification information for the recipient, such as a personalized greeting, the recipient's name, and other content related to the recipient. Additionally, the communication may include content based on data in the file, such as an identification of the service provided to the recipient. In one exemplary embodiment of the present invention, an email is provided to a customer regarding a repair performed on the customer's vehicle.

Figure 6:
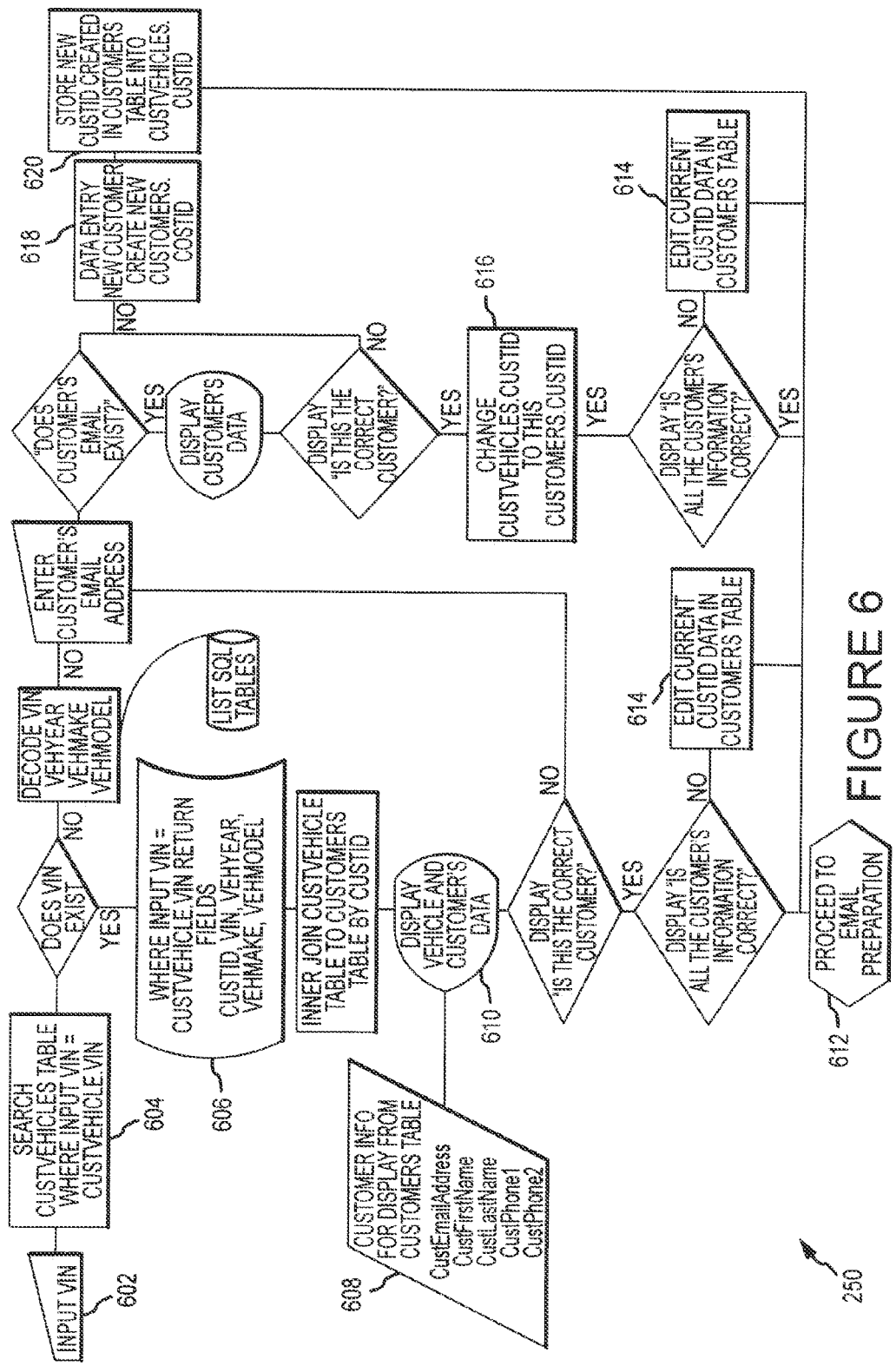
FIG. 6 is a flow diagram depicting an exemplary process for providing a communication to a customer according to various aspects of the present invention.

FIG. 6 depicts an exemplary process for providing a communication (250) to a customer in accordance with the present invention. In this exemplary process, an identifier (such as a vehicle identification number (VIN)) and/or information for a customer can be entered to prepare an email to the customer. A VIN can be entered (602) and searched for in the database (604). If the VIN is found in the database, the VIN is used to retrieve a customer identifier (i.e., owner of the vehicle), as well as the year, make, and model of the vehicle (606). The customer's email address, name, and telephone number(s) can be entered or retrieved from the database (608) and displayed together with the vehicle information (610). If the information is confirmed to be correct, an email can be prepared (612), such as the emails depicted in FIGS. 7 and 8, which are described in more detail below. Any of the customer's information may be modified (614). If the VIN of the vehicle is not found in the database, the vehicle can be associated with a customer in the database (616). If neither the VIN nor the customer are found in the database, a new entry is created (618) and stored (620) in the database.

Figure 7:
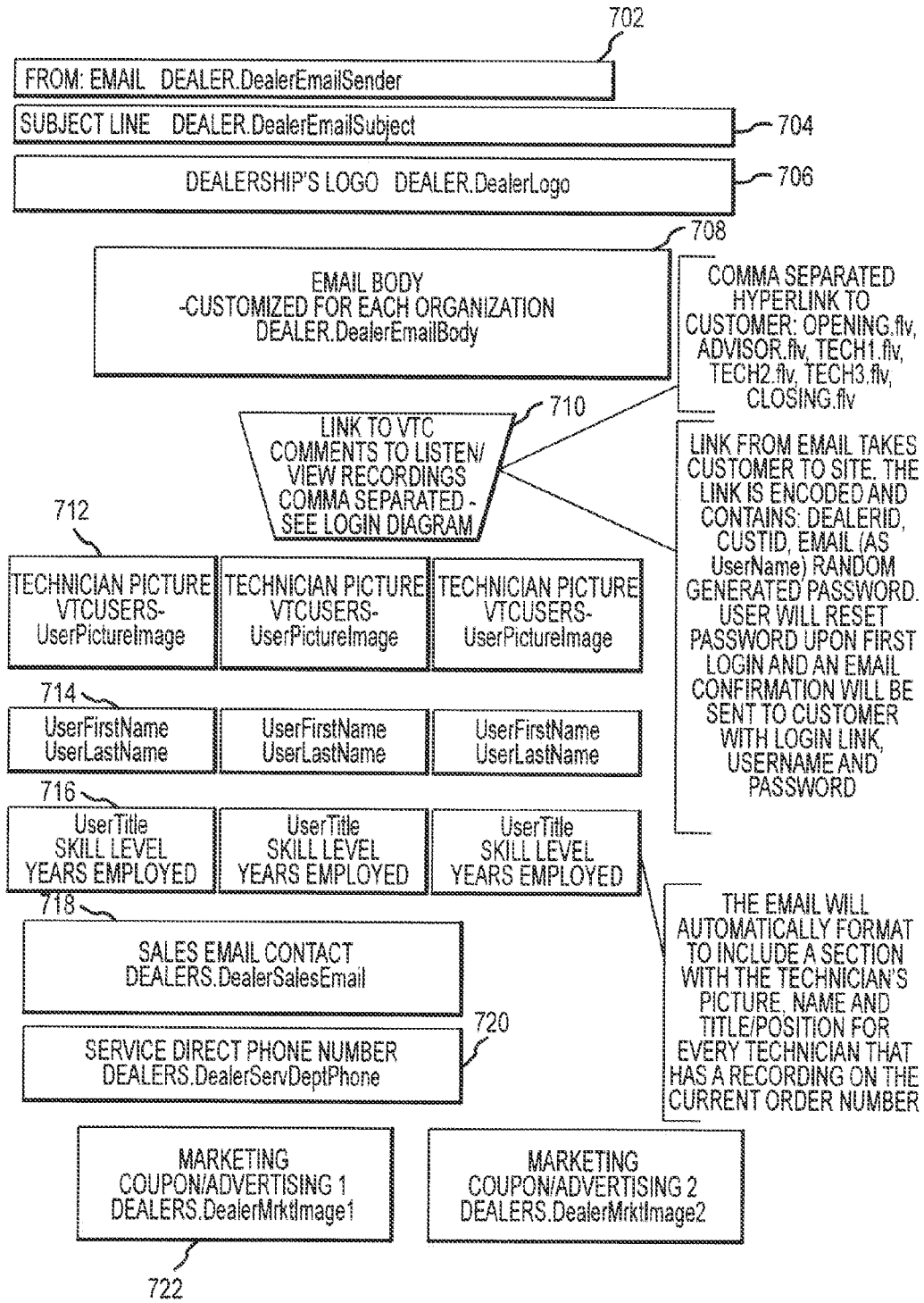
FIG. 7 is a block diagram showing the content of an exemplary email communication to a customer according to various aspects of the present invention.

FIG. 7 is a block diagram showing the content of an exemplary email communication to a customer. In this example, the email includes the source address 702, such as the simple mail transfer protocol (SMTP) address of the service provider. The email further includes a subject line 704, which may be customized based on the customer's identity, the service that was performed for the customer, or any other criteria. The email may include a logo for the service provider 706. The email body 708 may include any desired information, and may be customized based on the service provider, the customer, the service provided, or any other criteria. A link 710 (such as a Hyperlink that takes the recipient to a customer login screen) is provided to allow the customer to access a file stored on server 110 or database 120 pertaining to the service provided. In this exemplary embodiment, the file includes recorded audio comments from the technician(s) who performed the service on the customer's vehicle. By clicking on the link, the customer's web browser is directed to a web page (hosted by the server 110) where the customer can log on and access the file. Instructions for logging in to the website (including a username and password) may be provided in the email body 708. Upon successful login, the customer may be given the option to change the password and/or username.

The exemplary email depicted in FIG. 7 may include any other content to help convey information to the customer, as well as to help provide a positive experience for the customer. In this exemplary embodiment, the email includes pictures 712 of one or more technicians who were involved in the service of the customer's vehicle, as well as their names 714 and background information 716 (i.e., title, skill level, and years employed with the service provider and/or in the industry). The email may include contact information for the customer to use, such one or more email addresses 718 and one or more telephone numbers 720. The email may also include one or more marketing offers or coupons 722.

FIG. 8 shows sample content of an email with the fields described above for FIG. 7. Among other things, customized emails such as those depicted in FIGS. 7 and 8 allow a service provider to present a customer with detailed information on a service (e.g., a suggested maintenance or repair, or a service performed previously), and to market future services to help ensure return business and build customer loyalty.

The communication may include the file (e.g., attached to an electronic message) or may allow the user to access the file stored in another location, such as in database 120. In one exemplary embodiment of the present invention, a communication includes a link (such as a hypertext transfer protocol (HTTP) link or hypertext markup language (HTML) link) that allows the recipient to access the file. Access to the file may be provided in any other desired manner. For example, the message may include instructions to allow the recipient to log onto a website to access the file, such as by providing a username and password. Alternatively, the communication may include an authorization code that the recipient can provide to the server 110 to gain access to the file.

Access to the file may be restricted after a predetermined period of time. For example, after a predetermined time period, a link to a file provided in a message may expire or a username and password provided to a recipient to access the file through a website may become inactive. The customer can request access to the file by sending a request to the server 110 (e.g., via email). To save storage space on the server 110, database 120, and/or other storage medium (such as a storage area network in communication with the server 110), files and database records can be archived. Archiving can be performed based on any desired criteria, such as the current storage capacity of the server 110, as well as the age of a file or database record. The database record can be updated to point to the new archived location of a file, allowing users to continue to access the file. In one embodiment of the present invention, the repair history for a vehicle is maintained through files and database records regardless of the current owner of the vehicle. In this manner, a comprehensive repair history for a vehicle (regardless of the number of owners of the vehicle) can be retrieved using systems and methods of the present invention.

In addition to being provided electronically, the communication and/or file may also be physically provided on a tangible medium (e.g., a compact disc (CD) or digital video disc (DVD)) to a recipient. The communication may be delivered to any destination, such as an address (e.g., a physical address or email address) provided by a data source.

The communication may be provided to any desired recipient, such as the user who created the file, a customer for whom a service was provided, a supervisor, an automated system, or any other entity. The communication may be provided to a recipient automatically or manually. For example, an email communication to a recipient may be automatically provided by the server 110 once the file is created. Alternatively, the file may be provided at the direction of a user, such as a service provider or customer for whom a service is performed.

A communication providing access to the file is provided to a customer upon direction by the service provider. Among other things, this allows the service provider to review the file and message and add or delete content as appropriate before the message is sent. The communication may also be provided to a recipient upon receiving a request for the file from the recipient. The recipient may provide the request for the file in any desired manner, such as through a website interfaced over the Internet, an email, a telephone call, and/or an SMS message. Among other things, allowing a recipient to request the file ensures that communications are not sent to customers who would view the communication as "spam."

Figure 9A:
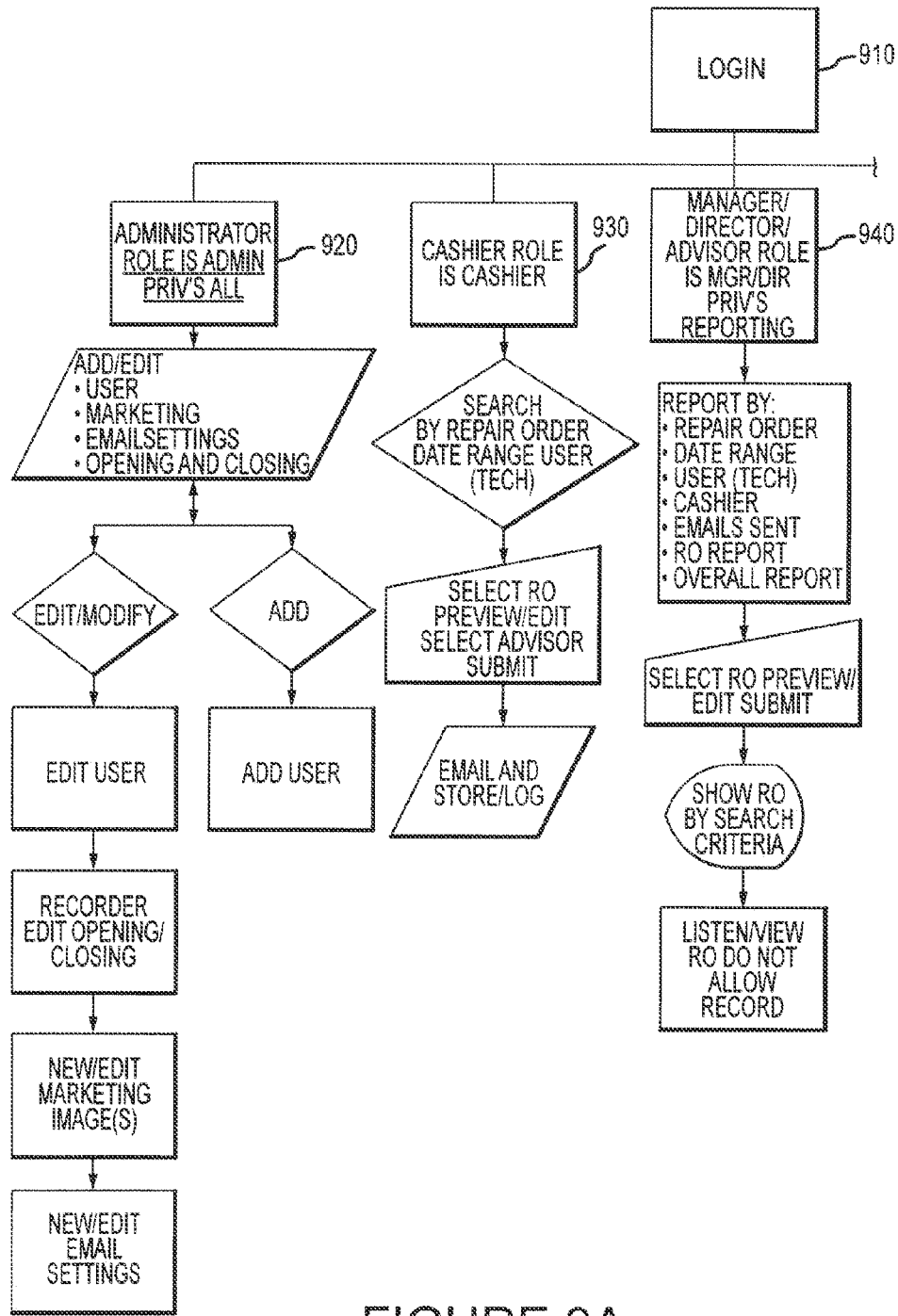
FIG. 9 is a flow diagram depicting the functions different members of a service provider can perform in accordance with the present invention.
Figure 9B:
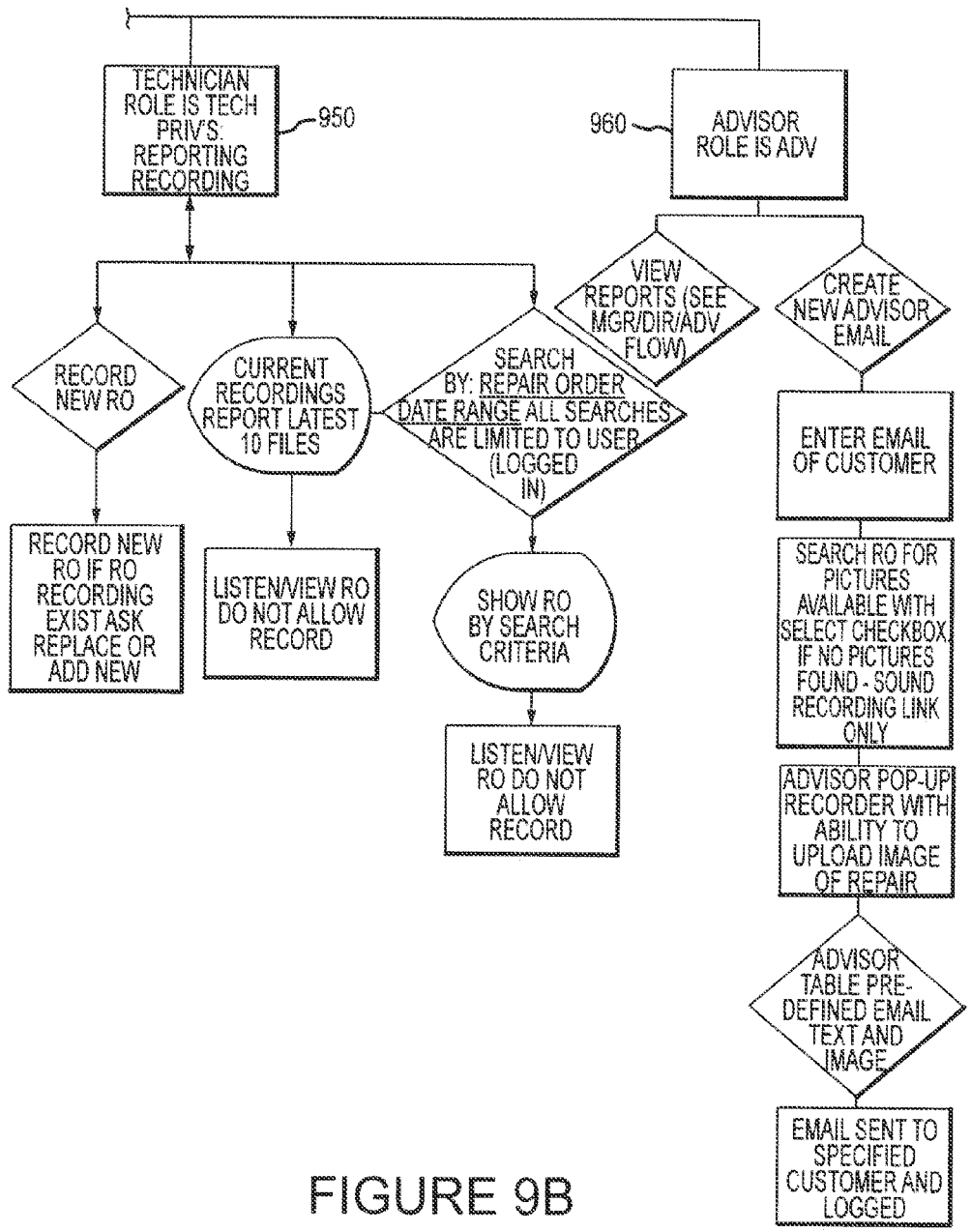

FIG. 9 is a flow diagram depicting the functions different members of a service provider (a car dealership in this example) can perform in accordance with the present invention. A user logs in (910) to the server 110 by providing a username and password. On login, the server 110 determines the role of the user (e.g., administrator, cashier, manager, director, advisor, or technician) as well as the privileges of the user to perform various functions. In the case the user is an administrator (920), the user has access to all functions of the server 110, and can thus add, remove or edit user information, marketing information, email settings, and settings for opening and closing messages provided to the customer via email.

If the user is a cashier (930), the user can search the database 120 for files based on a repair order, date range, and/or a technician who performed a repair. The cashier can preview the file, as well as add data to the file (e.g., information on the vehicle and/or the customer). The cashier may prepare and send an email to the customer, such as the emails described above with regards to FIGS. 7 and 8.

Figure 10:
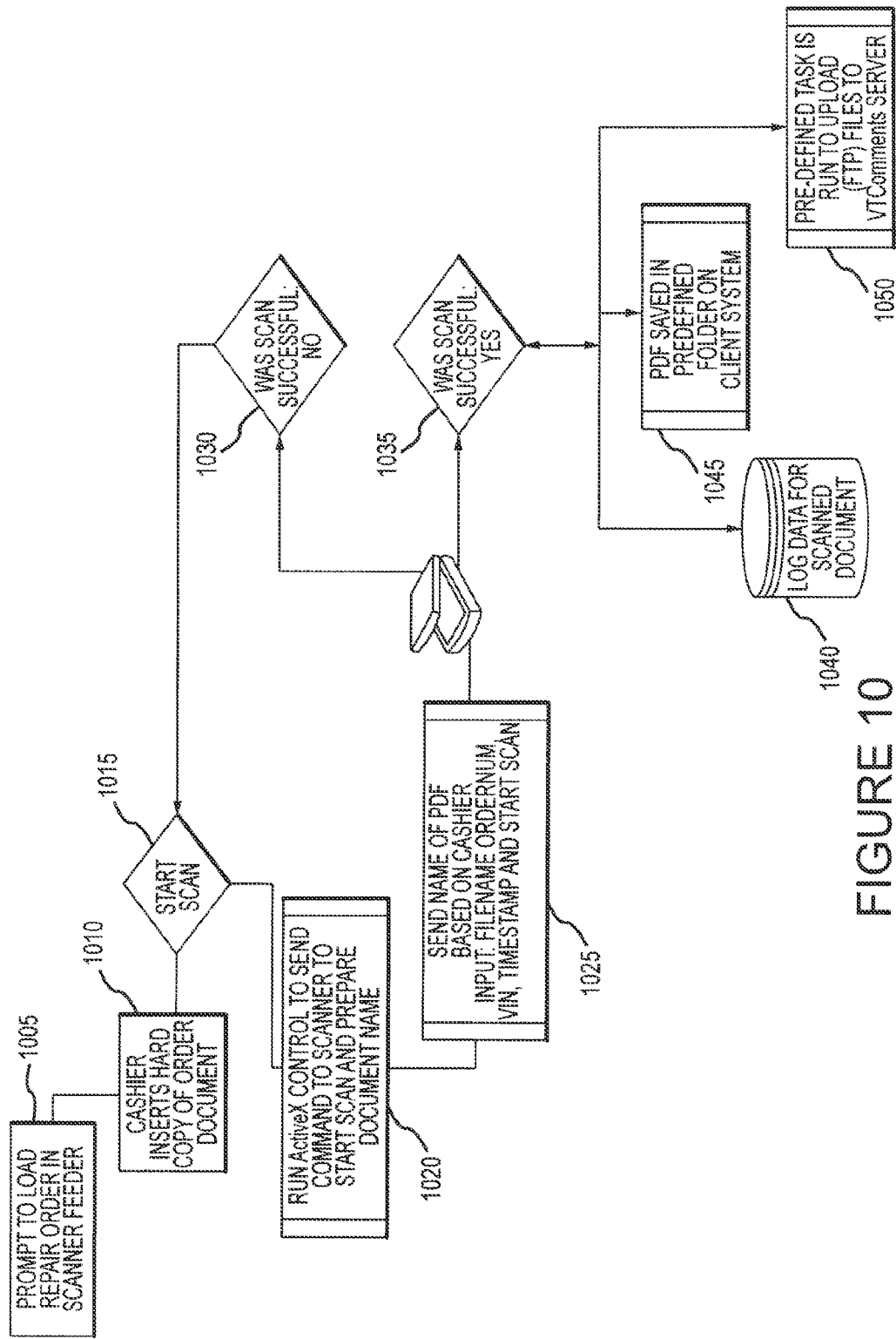
FIG. 10 is a flow diagram depicting a process for retrieving data from a hardcopy in accordance with the present invention.

Additionally, referring now to FIG. 10, the cashier may scan data from a hardcopy (such as a service invoice) for inclusion in the file. Optical character recognition (OCR) software may be used to translate data from the scanned document into a machine-readable format for use with systems and methods of the present invention. In the process depicted in FIG. 10, software operating on the server 110 prompts the cashier to load a service invoice into a scanner feeder (1005) for a scanner in communication with the server 110. The cashier loads the hard copy of the document into the scanner (1010) and initiates the scan (1015). The software on the server 110 interfaces with the scanner to perform the scan (1020). If the scan is unsuccessful (1030), the cashier is prompted to re-scan the document. If the scan is successful (1035), data from the scanned service invoice is logged (1040). Additionally, the scanned document is saved in Adobe PDF format (1045). A process is run (1050) whereby data from the scanned document, including the entire PDF file itself, may be added to an existing file or used to create a new file. Where data from the repair order would supplant data already in the file, the cashier may determine whether to overwrite existing data in the file (e.g., if the existing data is outdated or incorrect) or to keep the existing data in the file and discard the data from the repair order.

Referring back to FIG. 9, if the user is a manager or director (940), the user can analyze the file and/or database entries to determine metrics and prepare reports. Among other things, the user can use the metrics to verify the successful delivery of emails to customers.

If the user is a technician (950), the user can record audio and/or video, or edit a file that was previously created by the user pertaining to a service provided to a customer. The recorded content is stored in a file on the server 110 or database 120 and can be archived for later access by the customer or other entity. In the exemplary embodiment of the present invention depicted in FIG. 9, a technician is prevented from modifying or deleting files already provided to the customer.

If the user is an advisor (960), the user can determine metrics and prepare reports as described for the manager or director (940). Additionally, the user can prepare emails to customers that include still pictures, audio, and/or video to follow up on the service performed for the customer and/or to provide additional information on the service. The advisor can create content (such as audio and/or video recordings) in the same manner as the technician, allowing the advisor to suggest and describe additional repairs or maintenance for the customer's vehicle.

While the present invention has been described with regards to its use in enhancing customer service for service providers in the automotive sector (such as car dealerships and repair centers providing services on vehicles), the present invention may be utilized in many other fields. For example, the present invention may be utilized to provide patients of a hospital or doctor with information on medicines prescribed for the patient, as well as for procedures (such as a surgery) performed for the patient. Likewise, the present invention may be used to provide information and enhance customer service for customers in the field of law, where the present invention can provide client access to long and/or complicated legal advice, statutes, documents, or other information. The security features associated with the present invention can allow a client to safely retain and retrieve important documents such as wills and contracts without fear they will be lost or destroyed. Similarly, the present invention can allow audio, photos, video, and other information pertaining to a home inspection, appraisal or real estate transaction to be provided to a customer. The present invention may also be used to provide a customer with information related to insurance policies, coverage, and claims. The present invention may be used in conjunction with any other service-related field.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A method performed by a computer system, the method comprising:
    storing an electronic file on the computer system, the file comprising:
        an identifier for a vehicle;
        information regarding a service performed on the vehicle; and
        information regarding the service provider that performed the service on the vehicle; and
    creating an entry in a database, the entry comprising reference information pertaining to the file, the database entry to determine at least one of the following: information regarding creation of the file; information regarding the communication provided to the user; a service history for the vehicle;
    contact information for the customer; marketing information; a status of the service on the vehicle; and combinations thereof; and
    making the file remotely retrievable by (i) any authorized user using either a user identifier or the vehicle identifier, and (ii) a customer.

2. The method of claim 1 that further comprises providing an electronic communication to the customer, the electronic communication comprising a link to the file.

3. The method of claim 2, wherein the user to whom the electronic communication is provided is a customer corresponding to a customer identifier in the file.

4. The method of claim 2, wherein the communication to the user is at least one of an electronic mail and a short message service (SMS) message.

5. The method of claim 4, wherein providing the communication to the user includes delivering the at least one of the electronic mail and the SMS message to an address received from the data source.

6. The method of claim 2, wherein the link to the file expires after a predetermined period of time.

7. The method of claim 2, wherein providing the communication to the user is performed in response to receiving a request for the file from the user.

8. The method of claim 7, wherein the user providing the request for the file is remote to the computer system.

9. The method of claim 8, wherein the request for the file is provided using at least one of a website interfaced over the Internet, an email, a telephone call, and an SMS message.

10. The method of claim 2, wherein providing the communication to the user further includes providing an authorization code to the recipient that, when provided to the computer system by the recipient, allows the recipient to gain access to the file.

11. The method of claim 1, wherein the customer can access the file by using either a customer identifier or the vehicle identifier.

12. The method of claim 1, wherein the file further comprises at least one of the following, regarding the service performed on the vehicle: audio data, video data, still images, and text.

13. The method of claim 1, wherein the file further comprises at least one of:
    an identifier for a technician performing the service on the vehicle;
    an identifier for an advisor suggesting a maintenance procedure; and
    a service order identifier; and information from the customer either accepting or rejecting proposed service to the vehicle.

14. The method of claim 1, wherein analyzing at least one of the file and the database entry is initiated in response to a command from a user of the computer system.

15. The method of claim 14, further comprising limiting the access to the metric based on a security level associated with the user of the computer system.

16. The method of claim 1 wherein the file is remotely retrievable by the customer via a wireless connection.

17. A method performed by a computer having a searchable database, the method for storing a file that has been received, the file including a vehicle identifier and a user identifier, and at least one of audio, video, text, and one or more still images, the method comprising:
automatically storing a file into the searchable database as the file is being created, the file capable of being located in the database by searching one or more fields, the one or more fields selected from the group consisting of:
a VIN of an automobile;
a name of the person who created the file;
a make, model and year of manufacture of the automobile;
a name of an entity that created the file;
a date the file was created;
service invoice information;
customer information concerning the vehicle;
a date the file was stored in the searchable database; and
a type of problem addressed in the file; wherein the file is remotely retrievable by (i) any authorized user using either the user identifier or the vehicle identifier, and (ii) a customer.

18. The method of claim 17, wherein the file is, as it is being created, automatically stored in the searchable database.

19. The method of claim 17, wherein creation of the file further includes:
establishing a connection between the computer and a user; and
enabling the user to speak into a receiver wherein the speech travels through the connection and is stored as audio in the file stored in the searchable database.

20. The method of claim 17, wherein the one or more fields are automatically populated when the file is created.

21. The method of claim 17, wherein the one or more fields are selected and entered by a user before creating the file.

22. The method of claim 17, further comprising changing the one or more fields after the file is created.

23. The method of claim 22, wherein the link is included in an email or SMS message.

24. The method of claim 22 that further includes one or more of the steps of (a) providing an authorization code to a user that allows the user to gain access to the file, and (b) providing an access code to a customer that allows the customer to gain access to the file.

25. The method of claim 17, further comprising the step of retrieving the file by either (a) a user using a user identifier or a vehicle identifier, or (b) a customer using either a customer identifier, a vehicle identifier, or by accessing a link that does not require an identifier.

26. The method of claim 17, wherein a link for the file is sent to the customer upon the request of the customer.

27. The method of claim 17, wherein a link for the file is sent to the customer in response to a command from a user.

28. The method of claim 17, wherein the file includes a plurality of entries entered by a plurality of users.

29. The method of claim 28, wherein at least one of the plurality of users works for a service provider different than the other of the plurality of users.

30. The method of claim 17, wherein the file further includes a field populated with an acceptance or rejection of a repair by a customer.

31. The method of claim 17 wherein the file is automatically stored via a wireless connection.

* * * * *